United States Patent Office 3,140,294
Patented July 7, 1964

3,140,294
PURIFICATION OF PYRROLIDONE PREPARED BY THE VAPOR PHASE AMMONOLYSIS OF BUTYROLACTONE
John M. Kolyer, Seekonk, Mass., assignor to FMC Corporation, New York, N.Y., a corporation of Delaware
No Drawing. Filed Mar. 21, 1962, Ser. No. 181,439
3 Claims. (Cl. 260—326.5)

This invention relates to the purification of pyrrolidone, and more particularly, to the removal of colored and fluorescent impurities from crude pyrrolidone.

Pyrrolidone is commercially prepared at the present time by the liquid phase reaction of butyrolactone and ammonia at elevated temperatures and pressures for periods of 6–8 hours. In copending application Serial No. 158,904, filed December 12, 1961, by Kolyer, Tuemmler and Liao, a novel process is disclosed for the preparation of pyrrolidone by the vapor phase ammonolysis of butyrolactone in the presence of an aluminum silicate clay catalyst. Although yields in the range of about 95–100%, based upon the butyrolactone conversion, are readily obtained by this process, the crude product is contaminated by colored and fluorescent impurities which cannot be removed by fractional distillation.

It is an object of this invention to provide a convenient and economical process for the purification of crude pyrrolidone.

Another object is to provide a process for removing colored and fluorescent impurities from crude pyrrolidone prepared by the vapor phase ammonolysis of butyrolactone.

These and other objects will become apparent from the following description of this invention.

I have now found that crude pyrrolidone prepared by the vapor phase ammonolysis of butyrolactone and containing colored and fluorescent impurities may be purified by treating said crude pyrrolidone with 1–20% by weight of concentrated sulfuric acid and 0.5–25% by weight of activated carbon, separating the activated carbon from the pyrrolidone, distilling the pyrrolidone to remove additional impurities, and recovering purified pyrrolidone. Thus, by treating crude pyrrolidone with two inexpensive reagents, impurities which could not be removed by elaborate fractionation are readily removed by simple distillation.

Pyrrolidone is readily prepared by passing butyrolactone and ammonia vapors through a heated reactor packed with an aluminum silicate clay catalyst at a temperature of about 200–400° C. and for a contact time of about 1–30 seconds. The vaporous reaction product issuing from the reactor contains a mixture of pyrrolidone, butyrolactone, γ-hydroxybutyramide, ammonia and water. The vapors are condensed and ammonia is allowed to escape. The liquid product is then heated for a period of time sufficient to completely decompose the γ-hydroxybutyramide to butyrolactone and ammonia. The crude product mixture is distilled to remove ammonia and water, and the unreacted butyrolactone is removed by rectification. The resulting crude pyrrolidone is about 99% pure; however, it contains colored and fluorescent impurities which darken in color on standing, presumably due to air oxidation.

The concentrated sulfuric acid which is used to remove the colored and fluorescent impurities from crude pyrrolidone may be any commercially available sulfuric acid, such as those commonly having a purity of 75–100%. The sulfuric acid may be added in an amount of about 1–20% by weight, based upon the crude pyrrolidone. For best results the concentrated sulfuric acid is generally used in an amount of about 5–15% by weight. The sulfuric acid treatment is most conveniently carried out at ambient temperature for a period of about 0.5–10 hours, and preferably, for about 2–4 hours. However, elevated temperatures may be used, if desired.

For the activated carbon treatment of the crude pyrrolidone, any of the commercially available activated carbons such as vegetable charcoals and bone blacks may be used. The carbon should be present in an amount of about 0.5–25% by weight, and preferably about 1–10%, based on the pyrrolidone. The carbon treatment is suitably carried out by stirring or slurrying the carbon with the pyrrolidone at ambient temperature, although elevated temperatures may be used, if desired. An alternative means for treating the pyrrolidone is to pass the liquid upward or downward through a bed of carbon. The carbon should be in contact with the pyrrolidone for at least about 0.25 hours. Contact times up to about 24 hours may be used, if desired. Preferably the duration of the carbon treatment is about 0.5–5 hours. The carbon may be separated from the pyrrolidone by any suitable means such as filtration, decantation or phase separation.

The sulfuric acid and carbon treatments may be carried out simultaneously, or preferably, the crude pyrrolidone is first treated with sulfuric acid and then with carbon. It is believed that the sulfuric acid converts the colored and fluorescent impurities to non-volatile products which are then adsorbed by the carbon.

The distillation step involved in the purification process disclosed herein may be carried out by simple distillation techniques using atmospheric pressure or reduced pressure. It is generally preferred that reduced pressure be used, since this allows the use of lower temperatures, thereby minimizing decomposition of the pyrrolidone product.

Obvious modifications of the above procedure may occur to those skilled in the art. For example, after the crude pyrrolidone is treated and sulfuric acid, the pyrrolidone can be separated from the sulfuric acid and non-volatile impurities by distillation prior to the carbon treatment, thereby reducing the amount of carbon required to remove these impurities. The pyrrolidone product can then be redistilled to remove additional impurities after the carbon treatment.

The following example, illustrating the novel method of purifying crude pyrrolidone disclosed herein, is presented without any intention that the invention be limited thereto. All parts and percentages are by weight.

*Example 1*

Pyrrolidone was prepared as follows: Eighty-eight parts per min. of butyrolactone, preheated to 300° C., were swept by 42.5 parts per min. of ammonia at atmospheric pressure down through a vertical column reactor packed with montmorillonite clay spheres and heated to 300° C. The vapors were passed through the column for 1 hr. at a vapor-catalyst contact time of 6.6 sec. The resulting reaction product was condensed and excess ammonia was allowed to escape. The liquid product was refluxed for 12 hrs. to decompose γ-hydroxybutyramide, distilled at atmospheric pressure to remove water and ammonia, and rectified at 20 mm. Hg to separate butyrolactone. The pyrrolidone fraction, which contained 99% of the theoretical amount of pyrrolidone, based upon the butyrolactone conversion, developed colored and fluorescent impurities on standing resulting in a Gardner color of 4.5.

One hundred parts of this crude pyrrolidone fraction were stirred with 13 parts of concentrated sulfuric acid for 3 hrs. The pyrrolidone fraction was then distilled at 4 mm. Hg to give 94 parts of a colorless pyrrolidone distillate which darkened slightly on standing. The pyrrolidone fraction was stirred with 5.3 parts of activated carbon (Darco G–60) for 1 hr. The activated carbon was filtered off, and the filtrate was distilled at 4 mm. Hg to give 91 parts of a water-white distillate which remained colorless after standing for one month.

As will be apparent to those skilled in the art, numerous modifications and variations of the amount of sulfuric acid, the amount of activated carbon, and the distillation conditions illustrated above may be made without departing from the spirit of this invention or the scope of the following claims.

I claim:

1. The method of purifying crude pyrrolidone prepared by the vapor phase ammonolysis of butyrolactone and containing colored and fluorescent impurities which comprises treating said crude pyrrolidone with 1–20% by weight of concentrated sulfuric acid for at least 0.5 hour and 0.5–25% by weight of activated carbon for at least 0.25 hour, separating the activated carbon from the pyrrolidone, distilling the pyrrolidone to remove additional impurities, and recovering purified pyrrolidone.

2. The method of claim 1 in which 5–15% by weight of concentrated sulfuric acid and 1–10% by weight of activated carbon are employed.

3. The method of purifying crude pyrrolidone prepared by the vapor phase ammonolysis of butyrolactone and containing colored and fluorescent impurities which comprises treating said crude pyrrolidone with 5–15% by weight of sulfuric acid having a concentration of 75–100% for 2–4 hours, distilling the mixture to separate pyrrolidone from sulfuric acid and non-volatile impurities, treating the pyrrolidone with 1–10% by weight of activated carbon for 0.5–5 hours, separating the activated carbon from the pyrrolidone, distilling the pyrrolidone to remove additional impurities, and recovering purified pyrrolidone.

References Cited in the file of this patent

UNITED STATES PATENTS

| | | |
|---|---|---|
| 2,667,483 | Zeegers | Jan. 26, 1954 |
| 2,828,307 | Zoeterbrock et al. | Mar. 25, 1958 |